United States Patent

[11] 3,579,005

[72] Inventor Bruce P. Noble
2748 Grande Vista Ave., Oakland, Calif. 94601
[21] Appl. No. 844,845
[22] Filed July 25, 1969
[45] Patented May 18, 1971

[54] HOMOPOLAR DYNAMOELECTRIC APPARATUS
15 Claims, 10 Drawing Figs.

[52] U.S. Cl. .................................................. 310/178
[51] Int. Cl. ............................................... H02k 31/00
[50] Field of Search ........................................... 310/178, 266, 261, 154

[56] References Cited
UNITED STATES PATENTS

| | | | |
|---|---|---|---|
| 1,223,094 | 4/1917 | Neuland | 310/178 |
| 1,778,640 | 10/1930 | Maher | 310/178 |
| 2,847,591 | 8/1958 | Serna | 310/178 |
| 2,990,485 | 6/1961 | Lee | 310/178 |

OTHER REFERENCES

Steinmetz Publication "Theory & Calculation of Elect. Apparatus"; 1st Edition 1917; McGraw-Hill Book Co.; New York, N.Y.

Primary Examiner—D. X. Sliney
Assistant Examiner—R. Skudy
Attorney—Warren, Rubin, Brucker & Chickering ABSTRACT: A homopolar dynamoelectric apparatus wherein a field structure is formed with alternately spaced segments of high and low magnetic permeability adjacent a rotating conductive armature for inhibiting undesirable rotation of magnetic flux therewith. The armature is constructed with a plurality of individual sections each adapted to generate a separate voltage potential which may be electrically added to the outputs of each of the other armature sections to produce a resultant output voltage substantially higher than the low output potentials heretofore characteristic of homopolar devices.

Patented May 18, 1971 3,579,005

INVENTOR
BRUCE P. NOBLE
BY Warren, Rubin
Brucker & Chickering
ATTORNEYS

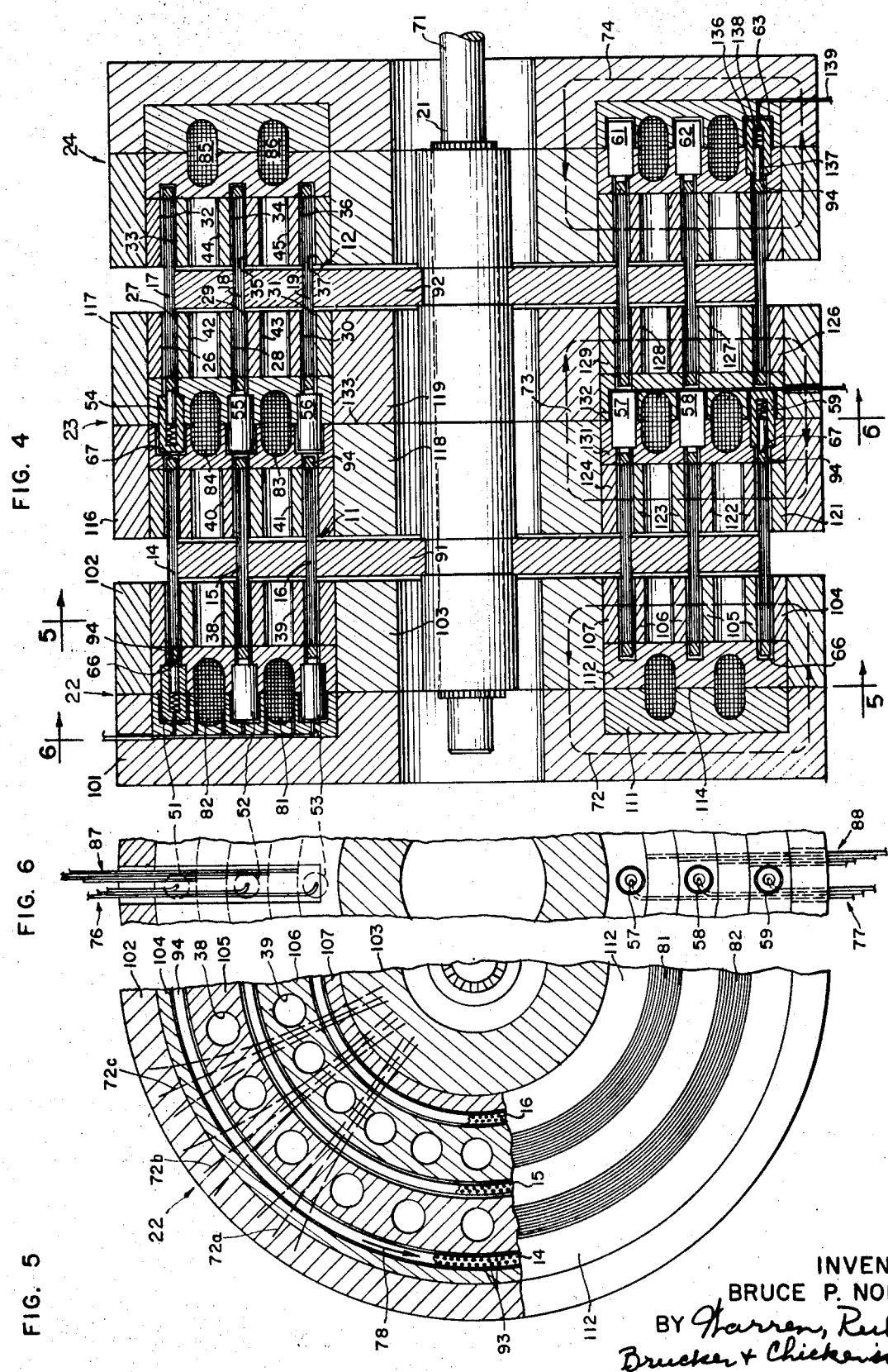

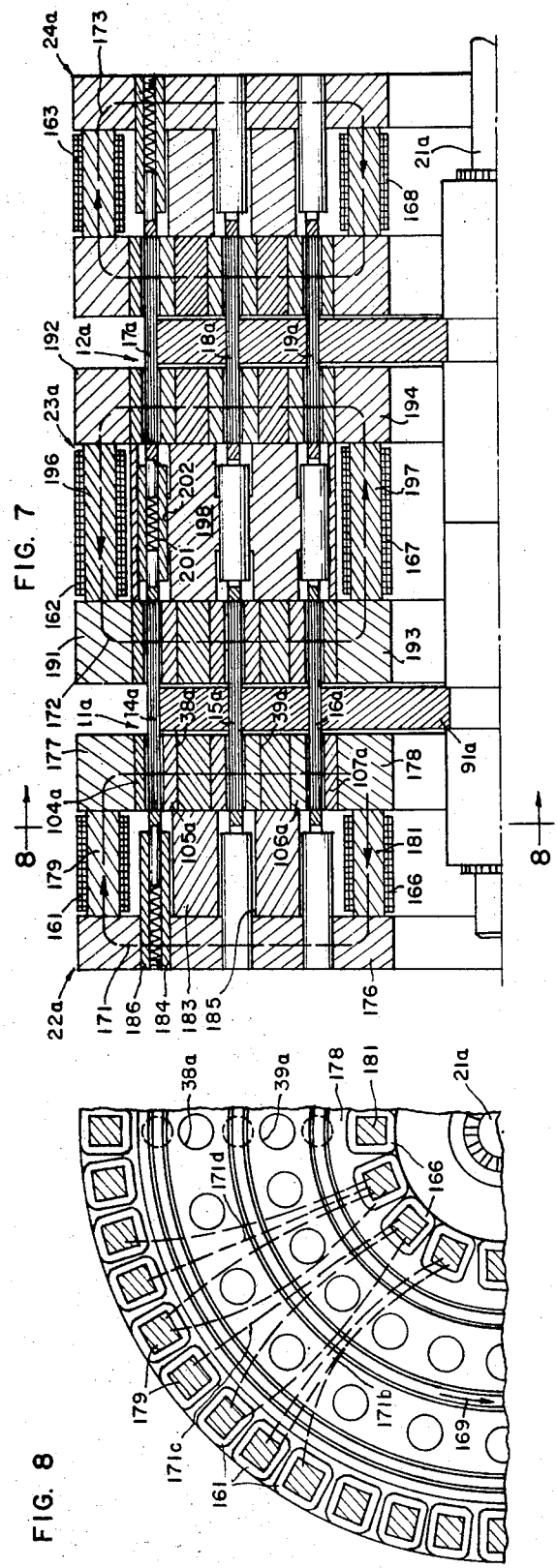
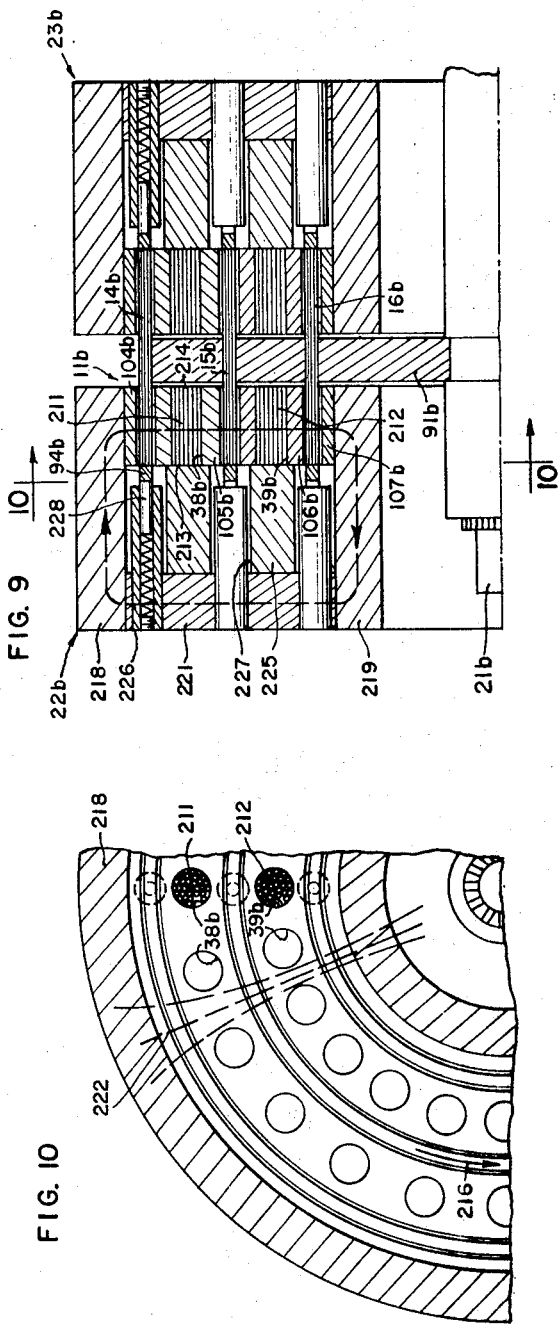

HOMOPOLAR DYNAMOELECTRIC APPARATUS

The present invention relates to dynamoelectric apparatus and more particularly to motors or generators of the homopolar class.

Homopolar dynamoelectric machines, sometimes referred to as unipolar or acyclic generators, are characterized as consisting of a conductive armature disposed for movement relative to a magnetic field such that the field lines pass through the armature in a constant direction and a continuous current is thereby generated. A classical example of such a device is the Faraday disc generator in which an electrically conductive disc is rotated about its central axis and a magnetic field is disposed to extend parallel to the disc axis transpiercing the opposed faces thereof. A pair of brushes are separately disposed for engaging central and peripheral surface portions of the disc providing an electrical connection to an external impedance load, whereby forced rotation of the disc generates a relatively small voltage across the load with the capability of delivering exceedingly large currents thereto. While homopolar machines have negligible hystersis loss (due to the constant direction of the magnetic field) and a simplicity of construction and operation which would provide advantages over other dynamoelectric devices in many applications, their characteristically low voltage output and low power efficiency (due primarily to eddy current losses) has discouraged widespread employment.

One of the principal difficulties encountered in regard to the power efficiency of homopolar devices is that of rotation of the magnetic field as the conductive armature rotates relative to the magnetic field-producing structure. As the field flux rotates, its current-producing effect on the armature is substantially lessened thereby reducing the current output from the armature. Furthermore, rotation of the field tends to set up eddy currents in the armature and field-producing structure which in turn generate heat thus adversely affecting the overall efficiency and operation of the unit.

Accordingly, it is an object of the present invention to provide a homopolar dynamoelectric apparatus having a greater operating efficiency particularly when used as a generator.

It is a further object of the present invention to provide such an apparatus capable of generating a relatively high-voltage output suitable for general, commercial and industrial use.

Another object of the present invention is to provide an apparatus of the type characterized capable of producing selective voltage and current output levels.

A further object of the present invention is to provide a homopolar dynamoelectric apparatus having a modularized construction employing universal components which may be individually manufactured, assembled in a variety of configurations and rapidly disassembled for servicing, replacement of parts or modifying the assembly for use in another application.

Other features, objects and advantages of the present invention will become apparent from the following description of the preferred embodiments of the invention. The description is to be read in connection with the accompanying drawings forming a part of this specification and illustrating the preferred embodiments of the invention.

In the drawings:

FIG. 4 is a cross-sectional view of a portion of the apparatus shown in FIG. 1;

FIG. 5 is a fragmentary cross-sectional view taken generally along lines 5-5 of FIG. 4;

FIG. 6 is a fragmentary cross-sectional view taken generally along lines 6-6 of FIG. 4;

FIG. 7 is a cross-sectional view of a portion of an alternative preferred embodiment of the present invention;

FIG. 8 is a fragmentary cross-sectional view taken generally along lines 8-8 of FIG. 7;

FIG. 9 is a cross-sectional view of a portion of another preferred embodiment of the present invention; and FIG. 10 is a fragmentary cross-sectional view taken generally along lines 10-10 of FIG. 9.

Figure 1:
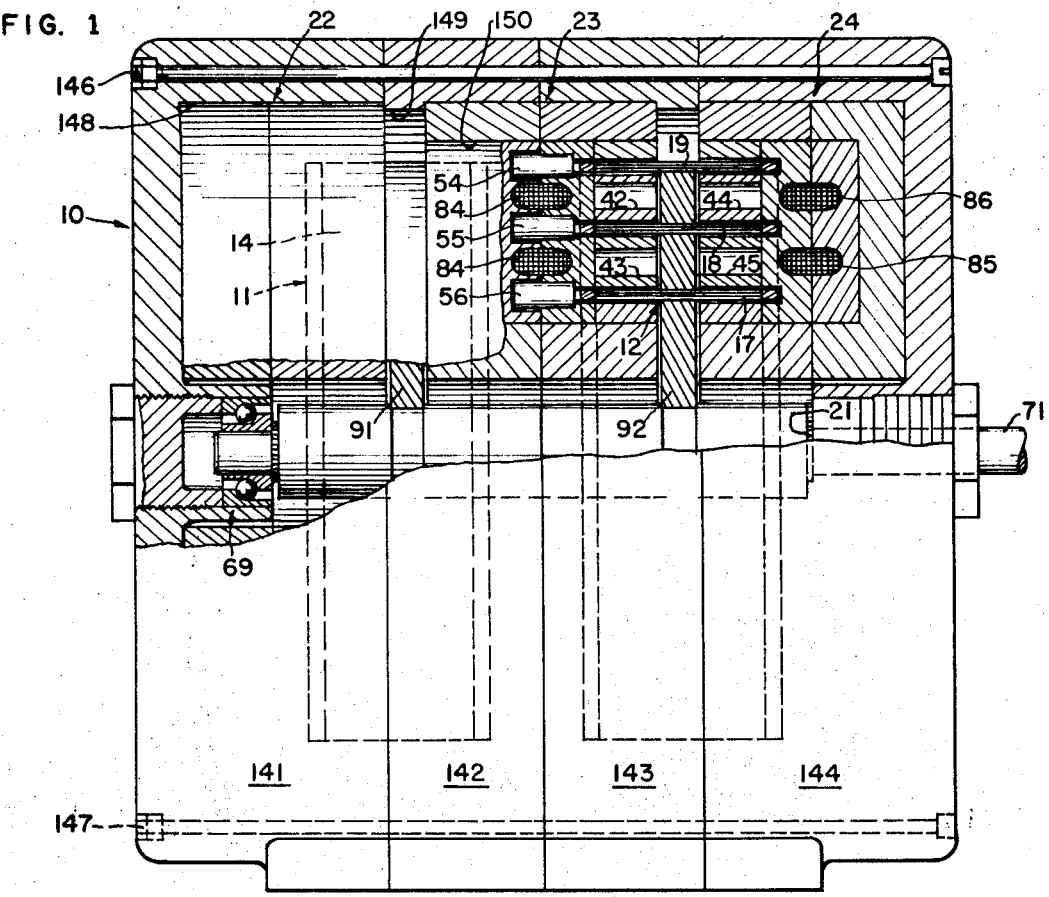
FIG. 1 is an elevation view, partly in section, of the homopolar dynamoelectric apparatus constructed in accordance with a preferred embodiment of the present invention.

With reference to FIG. 1, the homopolar dynamoelectric apparatus of the present invention briefly comprises a housing 10 providing means for rotatably supporting a pair of armature units 11 and 12 having electrically conductive hollow cylindrical drum members 14—19 disposed for joint coaxial rotation with an armature shaft 21. Annular field structures 22—24 (best shown in FIG. 4) have opposed pole faces disposed radially proximate opposite circumferential surface portions of the armature members such as pole faces 26—37 confronting radially outer and inner surface portions of drum members 17—19. In accordance with the present invention magnetic structures 22—24 are formed with circumferentially spaced regions of relatively low magnetic permeability, in this instance taking the form of air space cavities 38—45, providing alternately spaced high and low permeability segments for inhibiting rotational precession of the magnetic field circumferentially with armature members 14—19. A plurality of electrical brushes 51—63 are carried by housing 10 interiorly of structures 22—24, wherein pairs of such brushes are disposed for slidable electrical engagement with axial end portions of the armature members. For example brushes 51 and 59 slidably electrically engage axial end portions 66 and 67 of armature member 14, providing means for accommodating current flow longitudinally between the axial ends of the members by which the current passes between pole faces 26—36 transverse to the magnetic field.

In operation of the apparatus as a generator, armature shaft 21 is rotatably carried by housing 10 in bearings such as bearing 69. An end 71 of shaft 21 is adapted for connection to a prime mover (not shown) whereby members 14—19 of armature unit 11 and 12 are rotatably driven within the annular interspaces bounded by pole faces 26—37. The magnetic field lines produced by structures 22—24 traverse closed loop paths 72, 73 and 74, as shown in FIG. 4, which extend radially through members 14—19 to generate a transverse flow of current therein which may be applied to an external load (not shown) by means of brushes 51—63 and conductor leads 66 and 67. By the provision of air-spaced cavities 38—45, the magnetic field lines traversing paths 72, 73 and 74 are constrained against circumferential rotation by the presence of radially extending paths of easy magnetic flow, such as path 72a, 72b and 72c as shown in FIG. 5, circumferentially interspaced between regions of higher resistance to magnetic flow, in this instance provided by the air spaces in radially aligned cavities 38 and 39. In the absence of cavities 38 and 39, field lines traversing paths 72a—72c would tend to rotate with members 14—16 decreasing the relative motion between the field lines and the armature members and thereby reducing the generation of current in the armature. However, by the present invention as the field lines attempt to rotate in a direction 78 with members 14—16, they encounter the higher magnetic resistance of air or free space within cavities 38 and 39 and are thereby held in circumferential stationary regions for maximum generator efficiency. Furthermore, by constraining the magnetic field lines in this manner, the production of eddy current within magnetic structures 22—24 is substantially reduced if not entirely eliminated. By minimizing eddy current generation, the machine is capable of running at substantially lower temperatures, thereby enhancing the overall operating efficiency and service life of the apparatus.

The foregoing operation is most successfully accomplished when the relative permeability of the region defined by cavities 38—45 is substantially lower than the permeability of the material used in constructing field structures 22—24. Accordingly, structures 22—24 are preferably formed of a ferromagnetic material, such as transformer iron or steel, or as in the present embodiment, of permanently magnetized iron. As such materials have a permeability many orders of magnitude greater than the permeability of air or free space, the field guiding and confining effect provided by cavities 38—45 is advantageously achieved. Furthermore, by employing permanent magnetic field producing structures, field windings are not required and the construction and operation of the machine is thereby substantially simplified.

While unaided permanent magnets may thus be employed for field structures 22—24, in the presently preferred embodiment of the invention, field control electromagnetic coils 81—86 as shown in FIG. 4 are provided for aiding or opposing the permanent magnet fields in accordance with the direction of current applied to the coils through conductor leads 87 and 88 as shown in FIG. 6. That is, the amount of magnetic field traversing paths 72—74 as shown in FIG. 4 can be increased by forcing current through coils 81—86 in a direction creating an electromagnetic field encircling each pair of coils, such as coils 81 and 82, in the same direction as the permanent magnet field, in this instance the direction shown for field path 72. On the other hand, the current through the coils may be reversed to oppose the permanent magnet fields and thereby decrease the magnitude of the resultant field lines cutting armature members 14—19. Coils 81—86 thus provide a means for controlling the effective power output of the apparatus when used as a generator, merely by adjusting the amount and direction of current flow in these field control coils.

Figure 2:
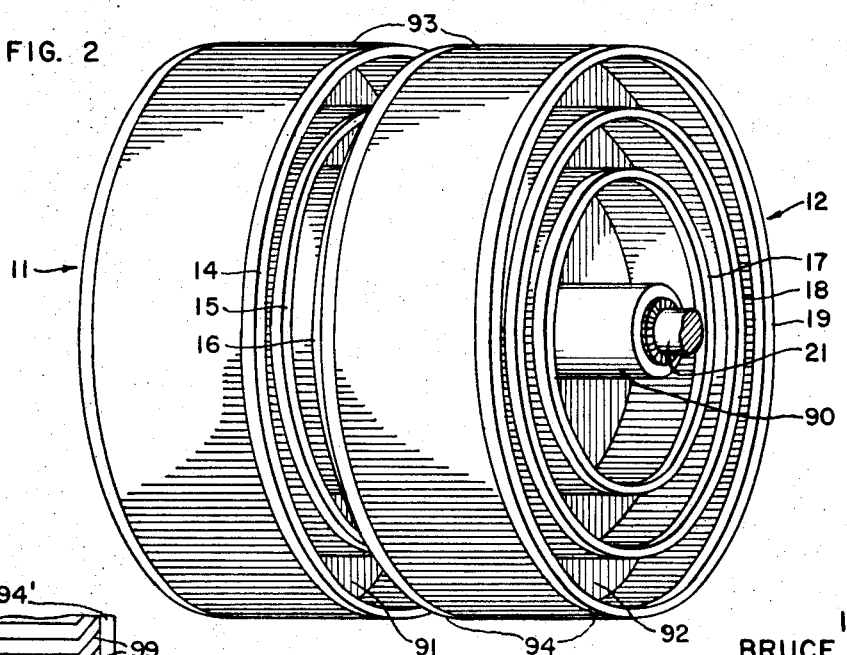
FIG. 2 is a perspective view of the armature portion of the apparatus shown in FIG. 1.
Figure 3:
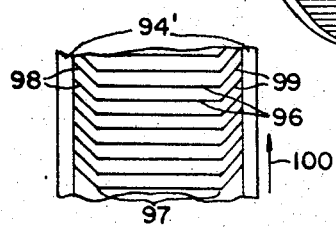
FIG. 3 is a fragmentary perspective view corresponding to a section of the armature unit shown in FIG. 2 and having an alternative preferred construction.

With reference to FIGS. 2 and 4, armature units 11 and 12 are respectively constructed with hollow cylindrical drum members 14—16 and 17—19 mounted in radically spaced concentric relationship about shaft 21 by means of axially spaced mounting discs 91 and 92 respectively fixed to hub sleeves 89 and 90 in twin splined to shaft 21. Hubs 91 and 92 are connected to axially central and circumferentially extending portions of members 14—19 such that axial end portions thereof protrude on either side of the respective hubs into the annular recesses defined by the pole faces of adjacent field structures 22—24. In order to further minimize the weight of armature units 11 and 12 and to enhance the operating efficiency of the machine, each of members 14—19 is preferably formed of an electrically nonconductive material in which a plurality of closely spaced elongate conductors 93 are disposed parallel to the axis to extend between axially opposed ends of the members as shown in FIGS. 2 and 5. A pair of electrically conductive rim members 94 circumferentially secured to axially opposed edges of each of members 14—19 and connected to opposed axial ends of conductors 93 serve to provide continuous conductive surfaces for slidable electrical engagement with brushes 51—63 as best shown in FIG. 3. In this manner, conductors 93 render each of armature members 14—19 essentially electrically conductive while at the same time minimizing the weight thereof.

With reference to FIG. 3, an alternative preferred construction is shown for a portion of an armature section corresponding to one of members 14—19, wherein a plurality of conductors 96 extending between rim members 94' is arranged to draw the flux lines inwardly toward a central axial portion of the armature member and thus avoid leakage of flux around the axial end edges thereof. For this purpose, each of conductors 96 are disposed with a central reach 97 trailing end reaches 98 and 99 relative to a direction of rotation for the armature indicated in this instance by arrow 100. In operation, as the flux lines emanating from the field structure have a tendency to resist cutting of the armature conductors, the flux lines are drawn inwardly from the member axial edges in an apparent direction of escape provided by the inwardly converging orientation of end reaches 98 and 99, only to be eventually entrapped and traversed by the trailing central reach 97 of each conductor. In this manner, axial end flux leakage is reduced if not entirely eliminated. The arrangement of the armature conductors in this instance is possible only for one direction of rotation and in the direction indicated by the orientation of conductors 96 relative to directions of rotation 100, as shown in FIG. 3, whereas armature units 11 and 12 equipped with conductors 93 extending in straight lines perpendicularly between rim members 94 may rotate equally well in either direction.

As armature units 11 and 12 are formed with a plurality of separate electrically conducting sections, in this instance drum members 14—19, the present invention provides for generating a relatively higher output potential than is characteristic of homopolar machines. With reference to FIGS. 4 and 6, each member and its associated pair of brushes generates a voltage potential upon rotation of shaft 21. Each of these separate outputs may be added or serially combined to derive a resultant output signal equal to the number of armature members times the voltage output available across each one. For example, the leads extending from pair of brushes 51 and 59 and carrying the output from member 14 may be serially connected with the leads emanating from pair of brushes 52 and 58 carrying the potential derived across member 15 etc. such that the voltages are summed. Alternatively, the associated pairs of brushes may be connected in parallel to provide a lower voltage and higher current output. Further still, brush leads 76 and 77 may be connected to a switching means (not shown) for rapidly switching between selective combinations of member outputs, each switching positions combining the outputs from armature members 14—19 in a desired fashion.

Field structures 22, 23 and 24 and housing 10 are each formed of a plurality of sections for facilitating disassembly and reassembly of the apparatus and providing a modularized construction to accommodate the addition of more than one central field structure identically formed to structure 23 whereby a larger machine may be readily formed for increasing the power output capability. In such a case, additional axially spaced armature units, identical to units 11 and 12 as shown in FIG. 2 would be provided for cofunctioning with the additional intermediate field structures corresponding to structure 23. Field structure 22, identical to structure 24, is comprised of an annular end permanent magnet section 101 having a C-shaped cross section as shown in FIG. 4; a pair of annular permanent magnet sections 102 and 103 having rectangular cross sections and extending from each of the legs of section 101; and a plurality of annular sections 104, 105, 106 and 107 formed of a ferromagnetic material and mounted in radially concentric relation between sections 102 and 103 to define three sets of opposed pole faces of structure 22 (corresponding to pole faces 26—31 shown for structure 24). Annular sections 105 and 106 as best shown in FIG. 5 are formed with cavities 38 and 39 extending parallel to the axes of each of these sections and coterminating with the pole faces defined thereby and extending in close spaced adjacency between armature members 14, 15 and 16.

A pair of nonmagnetic and electrically nonconductive annular parts 111 and 112 are mounted within an interior annular region defined by field structure sections 101—107, where parts 111 and 112 are formed with mated recesses for receiving and securing coils 81 and 82 and brushes 51, 52 and 53. Housing sections 101—107 are secured to parts 111 and 112 in such a manner that field structure 22 may be separated into two halves along an interface 114 upon disassembly to expose coils 81 and 82 and brushes 51—53 for replacement or servicing. For this purpose, section 101 is bonded by known expedients to part 111 while sections 103—107 are similarly bonded to part 112 along the surfaces of contact there between.

Similarly, field structure 23 is composed of annular permanent magnet sections 116, 117, 118 and 119; annular radially spaced concentrically mounted ferromagnetic sections 121, 122, 123 and 124 mounted adjacent armature unit 11 between permanent magnet sections 116 and 118; and correspondingly formed and mounted ferromagnetic sections 126, 127, 128 and 129 disposed between permanent magnet sections 117 and 119 adjacent armature 12. Mounted interiorly of a central annular region defined by the sections of field structure 23 are a pair of nonmagnetic and electrically nonconductive annular parts 131 and 132 having mated recesses for receiving and securing field coils 82 and 84 and brushes 54, 55, 56, 57, 58 and 59. Field structure sections 116 and 118 and sections 121—124 are bonded to part 131, while sections 117 and 119 and sections 126—129 are bonded to part 132 such that field structure 23 may be separated into two halves along an interface 133 for access to the field coils and brushes carried by parts 131 and 132.

In order to provide the uniform distribution of current flow through armature members 14—19, each pair of associated brushes 51—63 is disposed to engage opposite axial end portions of the corresponding armature member at diametrically opposed positions relative thereto. For example, associated pair of brushes 51 and 59 are mounted within parts 111, 112 and 131, 132 respectively, so as to engage axial end portions 66 and 67 of armature member 14 at positions 180° apart. In this manner, current flows longitudinally in conductors 93 between conductive rim members 94 and thereafter through members 94 to brushes 51 and 59 electrically engaged therewith at diametically opposite positions for uniform circumferential distribution of current flow through conductors 93.

Each of brushes 51—63 as best shown in FIG. 4 is constructed in a known manner, in this instance consisting of a housing 136, a brush member 137, a biasing spring 138 and a lead 139 electrically communicating with brush member 137.

The assembly shown in FIG. 4 is mounted within housing 10, formed of housing sections 141, 142, 143, and 144, by suitable means such as through bolts 146 and 147. Housing sections 141—144 are formed with interior axially spaced annular recesses 148, 149 and 150 for receiving and securing the exterior annular walls of field structures 22, 23, and 24 in mated nested relationship therewith. To accommodate the above noted additional intermediate field structures corresponding to structure 23, additional intermediate housing sections identical to sections 142 and 143 may be interposed end sections 141 and 144.

With reference to FIGS. 7 and 8, an alternative preferred embodiment of the invention is illustrated in which the components corresponding to those described in FIG. 4 are denoted by the same reference numeral with a postscript a. In this instance field structures 22a, 23a, and 24a are formed with a plurality of radially outer, circumferentially spaced electromagnetic field coils 161, 162, and 163 and a plurality of radially inner field coils 166, 167, and 168, cooperating with cavities 38a and 39a to enhance the magnetic field and to further inhibit rotation of the magnetic field lines. Each of the central axes of coils 161—163 and 166—168 are disposed with its central axis extending perpendicularly to the direction of rotation 169 of armature units 11a and 12a for generating magnetic flux lines traversing magnetic paths 171, 172, and 173. With reference to FIG. 8, the field lines are confined to magnetic paths, such as indicated at 171b, 171c and 171d, which extend through the central axial regions of coils 161 and 166. By this construction, attempted rotation of the field lines is discouraged by the amount of energy required for any given field line to jump from the central region of one coil to that of an adjacent coil.

In this instance field structure 22a is formed of ferromagnetic annular sections 176, 177 and 178, with a plurality of ferromagnetic core members 179 and 181 having coils 161 and 166 individually disposed thereon. Core members 179 and 181 are mounted between section 176 and sections 177 and 178 respectively as shown. Sections 176—178 and core members 179—181 together with annular sections 104a, 105a, 106a and 107a are bonded to a central electrically nonconductive and nonmagnetic annular part 183. Section 176 and part 183 are formed with aligned bores for receiving a set of three brushes, such as bores 184 and 185 in which a brush 186 is mounted for engagement with armature member 14a.

Field structure 23a is formed of ferromagnetic ring sections 191, 192, 193 and 194 between which a plurality of core members 196 and 197 are disposed for carrying coils 162 and 167. Sections 192—194 together with coils 162 and 167 and core members 196 and 197 are bonded to a central annular part 198 formed of nonmagnetic and electrically nonconductive material. Part 198 is formed with axially extending bores for receiving a set of three dual brushes, each engaging confronting axial end portions of radially registering armature members 14a—19a, such as shown fur dual brush 201 mounted within bore 202.

A further preferred alternative embodiment of the present invention is shown in FIGS. 9 and 10, wherein each of the field structure cavities is provided with a bundle of electrical conductors for further restraining the magnetic field against rotation, in this instance by electromagnetic repulsion. With reference to FIG. 9, the components of the apparatus previously described in regard to FIG. 4 are designated with corresponding component reference numerals together with the postscript b. As shown for cavities 38b and 39b, a multiplicity of elongate conductors 211 and 212 are disposed in lengthwise axial relation within the cylindrical chamber defined by the cavities and are insulated from each other and from the cavities. Multiplicity of conductors 211 and 212 are open circuited at opposed axial ends, such as ends 213 and 214 for conductors 211, whereby each of the conductors extends parallel to the axis of rotation of armature 11b and adjacent the radial surfaces of armature members 14b, 15b, and 16b. By this arrangement, as the magnetic field tends to rotate in a direction 216 as shown in FIG. 10 the transverse cutting of conductors 211 and 212 establishes an electrostatic field emanating from opposed axial ends of each group of conductors, such as ends 213 and 214, which by known energy considerations impedes further rotational precession of the flux lines.

With further reference to FIGS. 9 and 10, the magnetic field structures 22b and 23b here consist of a pair of identical assemblies disposed for cooperation with opposing lateral axial extensions of armature members 14b—16b. In this instance, the field produced by structures 22b and 23b is derived solely from annular permanent magnet sections such as concentrically disposed sections 218 and 219 for structure 22b. An annular ring section 221 formed of ferromagnetic material is disposed in spaced-apart relation with armature unit 11b and between members 218 and 219 to provide one leg of a magnetic path 222. Ferromagnetic sections 104b—107b are disposed between magnet sections 218 and 219 and concentrically with armature members 14b—16b, in a manner as described for sections 104—107 with reference to FIG. 4, to provide the opposed pole faces cooperating with the radially inner and outer surfaces of the armature members.

Permanent magnet sections 218 and 219 together with ferromagnetic section 221 and ferromagnetic sections 104b—107b are bonded to a central annular part 225 formed of electrically nonconductive and nonmagnetic material similar to parts 183 and 198 described with regard to FIG. 7. Section 221 and part 225 are formed with registering longitudinally bores for receiving a set of three brushes, such as bores 226 and 227 having brush 228 mounted therein for slidable electrical engagement with rim 94b of armature member 14b.

I claim:

1. A homopolar dynamoelectric apparatus comprising, an electric current conducting annular armature mounted for rotation about its axis, an annular field structure mounted concentrically with said armature and having opposed pole faces on opposite sides of and disposed normally to said armature and circumferentially thereabout, said structure being formed with circumferentially alternately spaced regions of relatively high and low magnetic permeability adjacent said armature for inhibiting rotation of magnetic flux with said armature, and electric current conducting means connected to said armature.

2. An apparatus as defined in claim 1, wherein said field structure comprises two radially spaced pairs of concentric cylindrical pole faces, said armature comprising a pair of hollow cylindrical members concentrically mounted for joint rotation between said pole faces, and said regions of low magnetic permeability being positioned circumferentially around said members.

3. An apparatus as defined in claim 2, wherein said members are formed of electrically nonconducting material, a plurality of electrical conductors carried by said members and extending to the axially opposed ends thereof, current conducting rings mounted on said ends and connected to said conductors, and said current conducting means comprising brushes slidably engaged with said rings.

4. An apparatus as defined in claim 3, wherein the brushes for each of said members are positioned substantially 180° apart relative to the circumference of the member.

5. An apparatus as defined in claim 2, wherein said field structure comprises a second set of radially spaced pairs of concentric cylindrical pole faces coaxially aligned with said first named pole faces, and said armature comprises a second pair of hollow cylindrical members concentrically mounted for joint rotation with said first named members and positioned between said second set of pole faces, said structure being formed with said pole faces cofunctioning to provide a common magnetic path intercepting all of said members.

6. An apparatus as defined in claim 5, wherein said field structure is disposed at the adjacent ends of said members, and additional field structures disposed at the remote ends of said members and each comprising radially spaced pairs of concentric cylindrical pole faces positioned interiorly and exteriorly of said members adjacent their remote ends.

7. An apparatus as defined in claim 6, a shaft journaled for rotation coaxially with said members, electrically nonconducting means supporting said members for joint rotation with said shaft with said members extending bilaterally from said means, and said field structure being formed with cylindrical recesses between opposed pole faces receiving end portions of said members.

8. An apparatus as defined in claim 1, wherein said structure regions of high magnetic permeability are formed of ferromagnetic material and said regions of low permeability are provided by cavities formed in said structure and bounded by said material.

9. An apparatus as defined in claim 2, wherein said structure is composed of a ferromagnetic material and is formed with a plurality of cavities circumferentially spaced and positioned between said members axially coextensive with said pole faces, whereby said material provides said regions of high permeability and said cavities bounded by said material provide said regions of low permeability.

10. An apparatus as defined in claim 9, electrically conductive means carried by said cavities for further inhibiting rotation of magnetic flux.

11. An apparatus as defined in claim 1, said field structure comprising, a plurality of circumferentially spaced electromagnetic field coils each having a central flux axis extending perpendicularly to the direction of rotation of said armature and providing a component of said magnetic flux.

12. An apparatus as defined in claim 2, said field structure comprising, a first plurality of electromagnetic field coils circumferentially spaced adjacent the radially outer said member, a second plurality of electromagnetic field coils circumferentially spaced adjacent the radially inner said member, said coils each having a central flux axis extending perpendicular to the direction of rotation of said members and magnetic core means connecting the central axes of said coils with said pole faces and providing said regions of high permeability circumferentially spaced by low permeability regions formed by the windings of said coils.

13. An apparatus as defined in claim 3, wherein said conductors carried by said members are arranged with axially central portions circumferentially trailing axial end portions relative to the direction of rotation of said members, whereby magnetic flux is drawn toward said axially central portions of said conductors and traversed thereby.

14. An apparatus as defined in claim 13, wherein said end portions of said conductors converge circumferentially axially inwardly to said conductor central portions.

15. An apparatus as defined in claim 2, wherein said field structure is comprised of an annular permanent magnet carrying said pole faces, and an electromagnetic field coil disposed in flux coincident relation with said magnet.